(12) United States Patent
O'Neill (10) Patent No.: US 8,719,964 B2
(45) Date of Patent: May 13, 2014

(54) THIN-WALL POLYMER COATED ARTICLES AND GLOVES AND A METHOD THEREFOR

(75) Inventor: Michael O'Neill, Middletown, DE (US)

(73) Assignee: O'Neill LLC, Wilmington, DE (US)

( * ) Notice: Subject to any disclaimer, the term of this patent is extended or adjusted under 35 U.S.C. 154(b) by 14 days.

(21) Appl. No.: 13/234,597

(22) Filed: Sep. 16, 2011

(65) Prior Publication Data

US 2012/0070647 A1 Mar. 22, 2012

Related U.S. Application Data

(60) Provisional application No. 61/383,683, filed on Sep. 16, 2010.

(51) Int. Cl.
*A41D 19/00* (2006.01)
*C08G 18/28* (2006.01)

(52) U.S. Cl.
USPC ............ 2/161.8; 2/159; 524/589; 524/590; 524/591; 524/839; 524/840; 428/423.1; 428/315.9; 428/315.5; 428/315.7; 427/385.5

(58) Field of Classification Search
USPC ............ 524/589, 590, 591, 839, 840; 428/423.1, 315.9, 315.5, 315.7; 427/385.5; 2/159, 161.8
See application file for complete search history.

(56) References Cited

U.S. PATENT DOCUMENTS

| | | | | |
|---|---|---|---|---|
| 6,433,073 | B1 * | 8/2002 | Kantner et al. | 524/591 |
| 7,240,371 | B2 * | 7/2007 | Liu et al. | 2/69 |
| 7,435,464 | B2 * | 10/2008 | Kim et al. | 428/35.7 |
| 7,566,502 | B1 * | 7/2009 | Chen et al. | 428/451 |
| 7,589,149 | B2 * | 9/2009 | Kim et al. | 524/591 |
| 7,771,806 | B2 * | 8/2010 | Kim et al. | 428/36.9 |
| 2008/0004395 | A1 * | 1/2008 | Covelli et al. | 524/591 |
| 2011/0077310 | A1 * | 3/2011 | Koecher | 514/788 |

\* cited by examiner

*Primary Examiner* — Michael L Leonard
(74) *Attorney, Agent, or Firm* — Tucker Ellis LLP (57) ABSTRACT

The present invention relates to articles and gloves having a polymer coating on at least a portion of the article or gloves's surface, wherein the polymer coating comprises a polyurethane dispersion made from the reaction product of an isocyanate functional prepolymer, a chain extender, and a chain terminator; and methods for making the same. The articles and gloves of the present invention have improved flexibility, breathability, dexterity and feel, and provide self-sanitizing and self-deodorizing capabilities and improved non-slip grip performance in dry, wet, humid and lubricated conditions.

19 Claims, 9 Drawing Sheets
(9 of 9 Drawing Sheet(s) Filed in Color)

Outer zone with numerous small capillary stoma structures.

Inner zone with large cavities and drape like sheets of polymer that from the inner surface of the glove to the outer layer..

Outer zone with numerous small capillary stoma structures.

Inner zone with large cavities and drape like sheets of polymer that from the inner surface of the glove to the outer layer..

Asperities structure on the outer surface of the coating of this invention

Figure 10

200X stacked vesicles structure forming capillaries between the outer surface and inner cavity zone.

Nitrile BBS refers to a bubble bursting technique to create a rough foam surface for greater grip.

Figure 14

THIN-WALL POLYMER COATED ARTICLES AND GLOVES AND A METHOD THEREFOR

CROSS-REFERENCE TO RELATED APPLICATIONS

This application claims priority from U.S. Provisional Application No. 61/383,683, filed Sep. 16, 2010, which is incorporated by reference herein in its entirety.

FIELD OF THE INVENTION

This invention relates to thin-wall polymer coated articles made of textiles, natural and synthetic fibers, and/or other substrates, including, textile films and coatings, medical coverings, sports apparel, industrial gloves, sports gloves, medical gloves, broom handles, cookware handles, and hand tool grips, and a method of making the same. In one embodiment, it relates to gloves having high surface friction and non-slip characteristics on at least one surface that are independent of any low molecular weight polymer treatments, tack enhancing agents, and particulates. In another embodiment, it relates to gloves with improved touch, feel and dexterity, that contain no ingredients associated with latex processing allergies and that are more breathable, safer to use, and promote hand and skin health. In yet another embodiment, it relates to gloves having a light translucent surface structure that contain self-sanitizing and/or deodorizing agents.

BACKGROUND OF THE INVENTION

Fabricators of products in the field of plastics and elastomers, such as thin-wall articles, and gloves in particular, have always had to compromise on either the performance of the gloves or the function of the human body while wearing them. In most cases, currently available articles and gloves cause either a huge loss of user dexterity and/or grip, or are made in such a way that the senses of touch and/or feel are diminished. This is particularly a problem for users of articles and gloves operating in high risk environments. For example, industrial and medical personnel typify glove users for whom high degrees of touch, feel, dexterity, and grip during prolonged use are particularly desirable due to the serious nature of accidents that can result from failure of these features in their work environments.

Additional deficiencies associated with available articles and gloves include that they can disrupt homeostasis and necessitate that the wearer remove them during use to regain normal body temperature regulation. Other deficiencies of available products include health problems posed to users that have type I or IV latex sensitivities or nitrile allergies. Yet other deficiencies common to currently available articles and gloves include that they lack breathability, accumulate body oils and sweat, and give off gas, unhealthy odors, and can provide an environment for pathogen growth. Still yet other deficiencies include that such articles and gloves have tight, inflexible coatings that cause user fatigue and muscle soreness. A further shortcoming includes grip failure, particularly in wet, solvent, or oily environments.

Available polymer coated articles and gloves made from natural rubber, isoprene, polybutadiene, nitrites and other synthetics, require surface modification via chlorination or the addition of talc or other particulates or coatings to eliminate natural tackiness. These articles and gloves suffer from particle shedding, which can spread allergens and contaminate the environment in and surrounding the article or gloves. Fiber-coated articles and gloves made with the foregoing treatments, such as a disposable exam glove, have a low coefficient of friction (below 0.5), are slippery when dry, and have almost no grip when wet. They are not breathable, inhibit homeostasis, and quickly cause a user's hand to become sweaty. They also give off gases and odors, and elutriate proteins and other unreacted potentially toxic processing aids.

Articles and gloves made of knitted substrates and having impervious coatings possess limited breathability and are overly thick and fatiguing, which limits dexterity and feel, inhibits homeostasis and causes sweaty hands. These articles and gloves also have almost no grip ability in wet conditions and can release gases, odors, proteins, and skin sensitizing compounds. Other available articles and gloves, including foam coated and foam processed laminated products, still suffer from many if not all of the foregoing deficiencies.

An as yet unmet need therefore exists for thin-wall polymer coated articles and gloves, and methods therefor, which eliminate or minimize the foregoing deficiencies.

SUMMARY OF THE INVENTION

Applicant has solved the aforementioned problems by providing thin-wall polymer coated articles and gloves, and methods therefor, which simultaneously provide user protection and additional performance enhancing benefits without significantly reducing the level of comfort, dexterity, feel, breathability and hand health necessary to allow prolonged use without disrupting the physiology of the human body. Applicant's invention further provides increased safety through consistency of grip and non-slip performance when used in dry, wet, humid and greasy environments where the ability to grip and securely hold or maneuver objects is a critical safety requirement. Applicant's invention additionally eliminates any issues related to allergic reactions, unpleasant odors, toxic and harmful gases, and pathogen activity through use of a light translucent surface structure and self-sanitizing and deodorizing ingredients. Applicant's invention additionally provides thin-wall polymer coated articles and gloves that are washable and reusable, and that can be repeatedly steam autoclaved without suffering significant degredation.

In one embodiment, the present invention relates to articles and gloves having a polymer coating on at least a portion of the article or gloves's surface, wherein the polymer coating comprises a polyurethane dispersion made from the reaction product of an isocyanate functional prepolymer, a chain extender, and a chain terminator, and wherein the isocyanate functional prepolymer comprises the reaction product of a polyol, an isocyante, and a stabilizing ingredient.

In one embodiment, the polyol may be a polyether glycol, polyester glycol, hydrogenated polybutadiene polyol, fluorinated polyether or a polysiloxane polyol. In another embodiment, the isocyanate may be 1,3 bis(1-isocynato-1-methyl) cyclohexane, diphenylmethane 4,4-diisocynate, diphenylmethane 2,4-diisocynate, 1-isocyanato-4-[(4-isocyanatophenyl)methyl]benzene, isophorone diisocyanate, 1,1'-methylenebis(4-isocyanatocyclohexane), toluene diisocyanate, hexamethyl diisocyanate, or dodecamethylene diisocyanate. In yet another embodiment, the stabilizing ingredient may be an ionic compound, a non-ionic compound, or a mixture thereof. In still yet another embodiment, the chain extender may be ethylene diamine, 1,3-diaminocyclohexane, 1,2-diaminopropane, 1,3-diaminopropane, metaxylylene diamine, ethylene glycol, 1,3-trimethylene glycol, 1,4-butanediol, 2,2-dimethyl-1,3-propylene diol, or a mixture thereof. In a further embodiment, the chain terminator may be diethylamine, a mono-alcohol, or a compound that can bond with an isocyanate group.

The invention also relates to a process for making a polymer coated article or glove. In one embodiment, an article or glove is directly dipped into the polyurethane dispersion of the instant invention, removed and allowed to rest until the coating of polyurethane dispersion ceases to drip from the coated article and the coated surface appears smooth, treated with an electrolyte solution, soaked in water at a temperature from about ambient to 85° C. for about 1 to over 60 minutes, and subsequently dried at a temperature from about 50° C. to 90° C. for up to about 40 minutes. In another embodiment, the article or glove is optionally treated with an electrolyte solution and dried prior to dipping the article or glove in the polyurethane dispersion. In yet another embodiment, the article or glove is optionally applied to a former member heated to a temperature from about ambient temperature to 90° C. before the article or glove is dipped into or coated with the polyurethane dispersion.

The invention also relates to a polymer coating comprising various embodiments of the polyurethane dispersion described above.

BRIEF DESCRIPTION OF THE FIGURES

The patent or application file contains at least one drawing executed in color. Copies of this patent or patent application publication with color drawing(s) will be provided by the Office upon request and payment of the necessary fee.

The invention can be more fully understood from the accompanying figures, which form a part of this application.

FIG. 1 provides charts comparing the results of dexterity tests performed using gloves of the instant invention and several commercially available gloves.

DETAILED DESCRIPTION OF INVENTION

It is to be understood that this invention is not limited to particular embodiments or examples, which can, of course, vary. It is also to be understood that the terminology used herein is for the purpose of describing particular embodiments only, and is not intended to be limiting. Further, all publications referred to herein are incorporated by reference herein for the purpose cited to the same extent as if each was specifically and individually indicated to be incorporated by reference herein.

The present invention relates to articles and gloves coated with a polyurethane-urea (hereafter, "polyurethane") dispersion. In one embodiment, the polymer coated articles of the invention include but are not limited to, thin-walled articles, gloves, broom handles, mop handles, hand tools, hammers, screw drivers, levers, pry bars, automobile steering wheels, knife handles, cookware handles, apparel, sporting equipment, films, and medical coverings coated with the polyurethane dispersion described herein. In another embodiment, the polymer coated articles of the instant invention are made from any known textile or any knitted, woven or non-woven natural or synthetic fiber, including soft and/or hollow fibers. In yet another embodiment, the polymer coated article is a glove made of the hollow-core hydrophobic polyester fiber developed by E. I. du Pont de Nemours and Company under the trade name THERMOLITE®.

Polyurethane Dispersion

In one embodiment, the polyurethane dispersion of this invention is comprised of highly hydrogen-bonded and segmented copolymers having soft and hard segments. The soft segments are mainly composed of high molecular weight polyether and polyester polyols, and are present in a mobile-coiled form. In one embodiment, these soft segments are mostly non-polar and they provide a soft, stretchable, and smooth macromolecular structure when formed into a film or coating. In one embodiment, the hard segments are mainly comprised of isocyanate, polyol, chain extenders, and chain terminators, and provide highly polar segments that cross-link to corresponding hard segments using hydrogen bonds between corresponding urethane and/or urea groups. In one embodiment, these segments can also contain ionic groups that impart improved stability and solubility of the polymer in the aqueous dispersion. Alternatively, polyoxyalkylene moieties that contain non-ionic ethylene oxide groups can also be introduced to improve stability and water solubility. Thus, these polyurethane-ureas comprise four main components: i) isocyanates, ii) polyols, iii) chain extenders/terminators, and iv) ionic or non-ionic stabilizers.

In one embodiment, the prepolymer of the instant invention is formed by the reaction of an isocyanate, a polyol and an ionic or non-ionic stabilizer at a temperature of about 70° C. to 90° C. In one embodiment, the temperature of the prepolymer reaction is about 70° C., 71° C., 72° C., 73° C., 74° C., 75° C., 76° C., 77° C., 78° C., 79° C., 80° C., 81° C., 82° C., 83° C., 84° C., 85° C., 86° C., 87° C., 88° C., 89° C., 90° C., or any temperature within a range defined by and inclusive of any two of the foregoing temperatures. The polymer is then formed by chain extension of the prepolymer via reaction with a solution containing a chain extender and terminator. The chain extender and terminator-containing solution may also contain solvent, water, or combinations thereof.

The isocyanates useful in this invention include 1,3 bis(1-isocyanato-1-methyl)cyclohexane, diphenylmethane 4,4-diisocynate, diphenylmethane 2,4-diisocynate, 1-isocyanato-4-[(4-isocyanatophenyl)methyl]benzene, isophorone diisocyanate, 1,1'-methylenebis(4-isocyanatocyclohexane), toluene diisocyanate, hexamethyl diisocyanate, and dodecamethylene diisocyanate.

Polyols useful in this invention include, for example, hydrolytically stable polyols such as the polyether glycols. Useful polyether glycols include polyethylene glycols, polypropylene glycols and polytetramethylene glycols. Useful polytetramethylene glycols include poly(tetramethylene ether)glycol, poly(tetramethylene-co-2-methyl-tetramethyleneether)glycol, and poly(ethylene-co-tetramethylene adipate)glycol. Additional useful glycols include the polyester glycols, hydrogenated polybutadiene polyols, fluorinated polyethers, and polysiloxane polyols.

The polyurethane dispersion of the instant invention can be prepared in, dispersed into, or treated with an aqueous, low molecular weight, polar protic solvent consisting of polar protic solvent and water. In one embodiment, the proportion of polar protic solvent to water is about 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, or any percentage within a range defined by and inclusive of any two of the foregoing percentages, by weight. In another embodiment, the proportion of polar protic solvent to water is about 5%, 6%, 7%, 8%, 9%, 10%, 11%, 12%, 13%, 14%, 15%, or any percentage within a range defined by and inclusive of any two of the foregoing percentages, by weight.

Useful polar protic solvents for the polyurethane dispersion of this invention are capable of hydrogen bonding, include an acidic hydrogen, and are capable of stabilizing ions in aqueous solutions. In one embodiment, the polar protic solvents useful to the instant invention include low alcohols with 1 to 4 carbon atoms. In another embodiment, the polar protic solvents useful to the instant invention include ethanol, methanol, ethanoic acid, n-propanol, isopropanol and butanol. In yet another embodiment, the polar protic solvents useful to the instant invention are ethanol and isopropanol.

Ionic and non-ionic stabilizers may be added to impart water solubility to the polyurethane dispersion. Useful stabilizers include ionic compounds, compounds capable of forming an ionic group, and non-ionic compounds. In one embodiment, useful ionic compounds include those having cationic or anionic moieties. Cationic stabilizers may be added into the dispersion as a polyol component. In yet another embodiment, useful cationic compounds include N-alkyl dialkanolamine. Anionic stabilizers can be reacted into the backbone of the polymer as a polyol component with an anionic sulfonate, phosphate, phosphonate or carboxylate group. Anionic stabilizers effectively stabilize the instant polyurethane dispersion when the anionic group comprises about 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25% mole, or any percentage within a range defined by and inclusive of any two of the foregoing percentages, of the prepolymer. In still yet another embodiment, useful anionic groups include the carboxylates and sulfonates. These anionic groups are ionized by neutralization by a base before or after preparation of the prepolymer. A useful base is a tertiary amine. In an additional embodiment, a useful sulfonate comprises a polyesterdiol structure with an appended sodium sulfonate, and a useful carboxylate includes those having a functional acid group, especially dimethylolpropionic acid, its polyethoxylated derivatives and acid polyethers. In other embodiments, useful carboxylates include those available from Union Carbide Corporation marketed under the UCAR-MOD® brand.

Useful non-ionic stabilizers include polyoxylated glycols containing polyethylene oxide groups. These groups are reacted into the backbone of the prepolymer. Non-ionic stabilizers effectively stabilize the instant polyurethane dispersion when the concentration of the ethylene oxide moiety comprises about 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50% mole, or any percentage within a range defined by and inclusive of any two of the foregoing percentages, of the prepolymer. In one embodiment, useful non-ionic stabilizers include the polyalkyl ethers.

Extension of the prepolymer chain is achieved through use of a chain extender. In one embodiment of the present invention, useful chain extenders include ethylene diamine, 1,3-diaminocyclohexane, 1,2-diaminopropane, 1,3-diaminopropane, metaxylylene diamine, ethylene glycol, 1,3-trimethylene glycol, 1,4-butanediol, 2,2-dimethyl-1,3-propylene did, and mixtures thereof.

Termination of polymer chain extension is achieved through use of a chain terminator. In one embodiment of the present invention, useful chain terminators include diethylamine, mono-alcohols, and compounds having any single reactive end group that can bond with an isocyanate group and thereby terminate polymer chain extension.

To impart softness and flexibility to the polymer coated article or glove of the instant invention, the prepolymer is processed to be of the low free isocynate kind. Additionally, polar aprotic solvents may be added to the prepolymer to prepare the monomers for chain extension and to reduce viscosity in preparation for dispersion. Useful solvents for addition to the prepolymer are porogenic and insoluble in the final precipitated polyurethane dispersion. Phase separation of the porogenic solvent from the polymer backbone creates micropores, cavities, and/or foam- or stoma-like structures in the region close to the surface of the final polymer coating as applied to a thin-walled article or glove. This improves breathability of the polymer coated article or glove. Useful polar solvents include more strongly polar solvents because they promote faster phase separation and creation of larger pores and cavities in the final polymer coating.

In some embodiments of the present invention, polar aprotic solvents useful in the polyurethane dispersion of this invention include dimethylsulfoxide (DMSO), liquid amides (for example dimethylacetamide (DMAc), dimethylformamide (DMF), N-methylpyrrolidone (NMP)), tetrahydrofuran (THF), methyl ethyl ketone (MEK), toluene, cyclohexane, and methylene chloride. The concentration of a polar aprotic solvent in the prepolymer is about 1%, 2%, 3%, 4%, 5%, 6%, 7%, 8%, 9%, 10%, or any percentage within a range defined by and inclusive of any two of the foregoing percentages.

Polyurethane polymers generally provide good moisture permeability by allowing moisture vapor to traverse the highly amorphous, non-cross-linked, soft segment structures. This attribute can be significantly improved by increasing the molecular weight contribution of any polyoxyalkylene segments during monomer preparation. The additional increase in ethylene oxide groups greatly improves moisture vapor transmission rates and thereby improves breathability of the coated material. In this way, the thin-wall polymer coated articles and gloves of this invention not only benefit from moisture vapor diffusion in the pores and cavity structures of the coating, but also from the polymer's amorphous macromolecular structure in the soft segment. Thus, the polymer coated articles and gloves of the instant invention have higher rates of moisture vapor transmission through the body of the coating than other types of covalently cross-linked polymers.

Two phases exist in the polyurethane dispersion of the instant invention: a dispersed phase, which comprises the macropolyurethane, and an external phase, which comprises the aqueous-protic solvent. The dispersed phase is formed by use of either of the well known inverse or direct addition techniques. In the direct technique, the monomer is heated to about 70° C. to reduce its viscosity and is then added to the bulk phase, which in the case of ionic dispersion, also contains a chain extender and a neutralizing agent. In the reverse technique, the external phase containing a chain extender is added to the monomer at about 70° C. with agitation and/or mixing. The fully-formed polyurethane droplets are then dispersed in the aqueous-alcohol bulk phase. The average dispersion particle size is less than 50 micron and the dispersion has a solids content of about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, or any percentage within a range defined by and inclusive of any two of the foregoing percentages. In one embodiment, the average dispersion particle size is less than about 5 micron. Chain extension of the prepolymer can be performed during this step by the addition of a chain extender and terminator in the aqueous phase.

The dispersion may also contain additional additives introduced via the external phase with an aqueous-protic solvent. Useful additives include antimicrobial agents, defoaming agents, leveling agents, thickeners, photostabilizers, and pigments. In some embodiments, useful additives include photocatalytic titanium dioxide, carbon black, and molecular sieve. Photocatalytic titanium dioxide having an average particle size from about 2 nm to 70 nm is useful in an amount comprising about 0.1 to 10% by weight of the prepolymer. In some embodiments, the photocatalytic titanium dioxide has an average particle size of about 2 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm, 18 nm, 19 nm, 20 nm, 21 nm, 22 nm, 23 nm, 24 nm, 25 nm, 26 nm, 27 nm, 28 nm, 29 nm, 30 nm, 31 nm, 32 nm, 33 nm, 34 nm, 35 nm, 36 nm, 37 nm, 38 nm, 39 nm, 40 nm 41 nm, 42 nm, 43 nm, 44 nm, 45 nm, 46 nm, 47 nm, 48 nm, 49 nm, 50 nm, 51 nm, 52 nm, 53 nm, 54 nm, 55 nm, 56 nm, 57 nm, 58 nm, 59 nm, 60 nm, 61 nm, 62 nm, 63 nm, 64 nm, 65 nm, 66 nm, 67 nm, 68 nm, 69 nm, 70 nm, or any size within a range defined by and inclusive of any two of the foregoing measurements. In some embodiments, photocatalytic titanium dioxide is used in an amount comprising about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, or any percentage by weight of the prepolymer that is within a range defined by and inclusive of any two of the foregoing percentages, specifically including fractions thereof. In some embodiments, Carbon black and/or molecular sieve are used in an amount comprising about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, or any percentage by weight of the prepolymer that is within a range defined by and inclusive of any two of the foregoing percentages, specifically including fractions thereof. In some embodiments, useful antimicrobial agents include sodium benzoate, miconazole nitrate, neomycin-polymyxin B bacitracin, and iodophor complexes such as povidone-iodine with polyethylene oxide adducts. In some embodiments, useful defoaming agents include non-ionic acetylenic glycols, such as Surfynol DF 110L, Surfynol SE-F, Surfynol DF-37 by Air Products Inc, SWS-211 by Wacker Silicone Corp., and Additive 65 by Dow Corning Corporation. In additional embodiments, useful photostabilizers include hindered amines such as Tinuvin 400 & 292 by Ciba-Geigy Ltd. in amounts less than about 1.0% by weight of the prepolymer. In still additional embodiments, antioxidants useful in the present invention include Irganox 245 & 1076 at concentrations of less than about 0.5% by weight of the prepolymer. In still yet additional embodiments, useful thickeners in the present invention include clays such as bentonites and hectorites. In other embodiments, useful thickeners include hydrophobically modified ethylene oxide and polyethylene glycol-based rheology modifiers that are urethane linked to hydrophobic end-groups.

Polymer molecules in the droplets of the dispersed phase are reoriented so that the bulk of the droplet is occupied by the hydrophobic soft segment polyol and as well as residual aprotic solvent and a portion of the amphiphilic low alcohol protic solvent. Consequently, the hydrophobic end of the protic alcohol associates with the non-polar soft segment in the core of the droplet. The highly polar hard segment groups migrate to the surface of the droplets and associate through ionic interaction with water and any free OH— groups in the alcohol. This interaction stabilizes the dispersion. The molecular orientation and the presence of residual solvent comprising about 1%, 2%, 3%, 4%, 5%, 6%, 7%, 8%, 9%, 10%, or any percentage by weight that is within a range defined by and inclusive of any two of the foregoing percentages, inside and on the surface of the droplets are important to the functional properties and structure of the final polyurethane coating.

Method for Making a Polymer Coated Article

In one embodiment, the herein described polyurethane coating is combined with a previously described article or glove to make a polymer coated article of the instant invention by first optionally applying a treatment of an electrolyte solution to the article or glove and subsequently drying said article or glove. The optional electrolyte treatment may be used to control the speed at which polyurethane droplets precipitate out of the dispersion onto the article or glove by destabilizing the dispersion. Use of an electrolyte causes rapid precipitation of polymer from the dispersion. Consequently, application of the optional electrolyte treatment can prevent total penetration of the constituent material of the article or glove by the polyurethane dispersion because the electrolyte gels the polymer at such a high rate. However, omission of the optional electrolyte treatment allows the polymer droplets to fully penetrate the constituent material of the article or glove and coat the interior and/or internal aspect of the article or glove as well.

In one embodiment of the instant invention, useful electrolytes include ethanoic acid, and soluble alkali metals, alkaline earth metals, and salts thereof, transition metal salts, calcium nitrate, and acetic acid. In another embodiment, useful electrolytes include calcium nitrate and acetic acid. Useful electrolyte solutions comprise electrolyte and water, where the electrolyte comprises about 1% to 50% by weight of the solution. In still another embodiment, a useful electrolyte solution comprises about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, or any percentage of electrolyte by weight of the solution that is within a range defined by and inclusive of any two of the foregoing percentages. In still yet another embodiment, a useful electrolyte solution comprises about 8%, 9%, 10%, 11%, 12%, 13%, 14%, 15%, 16%, or any percentage of electrolyte by weight of the solution that is within a range defined by and inclusive of any two of the foregoing percentages. In another embodiment, the electrolyte solution is sprayed on an article or glove. In a different embodiment, an article or glove is dipped into an electrolyte solution.

After the optional electrolyte solution treatment, the article or glove is at least partially dipped into or coated with the polyurethane dispersion so that the desired areas on the article or glove, up to and including the entire article or glove, are covered. The glove or article may be first optionally applied to a heated former or similar member to facilitate the dipping step. Coagulation of polymer droplets on the article or glove triggers formation of a polyurethane coating wherein the polyurethane droplets precipitate out of solution and the hard segments of the droplet surfaces hydrogen bond and fuse together. Water is simultaneously removed from the droplets, causing the droplets to shrink and form a coating or film as they combine and join.

The coated article or glove is removed from the dispersion and allowed to rest so that excess polymer dispersion may drip from the article or glove until dripping ceases and a polymer coating with a smooth surface is achieved. A drip tank may be used to facilitate recycling of polymer dispersion. This resting or dripping step creates large cavities and/or air pockets inside and throughout the constituent material and/or interstices of the article or glove.

The coated article or glove is then subject to a coagulation step. This step involves treating the coated article or glove with either water or an electrolyte solution. Useful electrolyte solutions include those disclosed above. In one embodiment, the coated article or glove is dipped into a coagulating tank containing water. In another embodiment, coated article or glove is alternatively dipped into a coagulating tank containing an electrolyte solution comprising water and about 8%, 9%, 10%, 11%, 12%, 13%, 14%, 15%, 16%, or any percentage of electrolyte by weight of the solution that is within a range defined by and inclusive of any two of the foregoing percentages. Electrolyte-induced coagulation causes the polymer to deposit and built up on the article or glove. As this occurs, bulk solvents begin to phase separate away from the polymer. The residual aprotic solvent and hydrophobically associated alcohol (i.e., protic solvent) in the bulk of the soft segment are squeezed out of the solid polymer and pool in numerous microscopic bubbles. These solvents will then concentrate as a separate phase just under the coagulated surface of the now formed thin-wall polymer coating.

As this process progresses, the polymer coated article or glove is then dipped or soaked in diffusing tanks filled with water at a temperature from about 40° C. to 85° C. for at least about 1 minute. The aprotic solvent pooled underneath the coagulated polymer surface will diffuse out of the polyurethane into the water, thereby allowing the water to occupy the micropores left behind. Any residual alcohol is also removed from the polymer coating in the same way. In one embodiment, the polymer coated article or glove is dipped or soaked in a tank containing water at a temperature of about 40° C., 41° C., 42° C., 43° C., 44° C., 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., 70° C., 71° C., 72° C., 73° C., 74° C., 75° C., 76° C., 77° C., 78° C., 79° C., 80° C., 81° C., 82° C., 83° C., 84° C., 85° C., or any temperature within a range defined by and inclusive of any two of the foregoing temperatures, for a period of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 minutes, or any time period within a range defined by and inclusive of any two of the foregoing times, or longer. In yet another embodiment, the polymer coated article or glove is soaked in a tank containing water held at a temperature of about 65° C. for a period of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 minutes, or any time period within a range defined by and inclusive of any two of the foregoing times.

This process is key to the development of high grip capability. Specifically, the coefficient of friction of the surface of the coating can be modified by controlling the temperature of the water and the time that the forming coating is subjected to it. In general, the coefficient of friction will decrease during the first few minutes of the water dipping or soaking step to its lowest level, then it will increase with additional time under water. A higher coefficient of friction may be achieved by longer exposure of the coated article or glove to water. Higher water temperatures accelerate this process but can decrease the maximum friction coefficient achievable by soaking for more than about 1, 2, 3, 4, 5, 6, 7, 8, 9, or 10 minutes, or any time period within a range defined by and inclusive of any two of the foregoing time periods. The combination of the water soaking process, solvent diffusion, and the composition of the polar macromolecular structure of the polyurethane determines the maximum grip capability under all conditions, including dry, wet and oily conditions. This step also forms the desired surface texture, internal polymer cavities, and stoma structures that enhance comfort, breathability and grip of the coated surface.

After soaking in water, the coated article or gloves are dried in a hot air convection drier for up to about 40 minutes at a temperature of about 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., 70° C., 71° C., 72° C., 73° C., 74° C., 75° C., 76° C., 77° C., 78° C., 79° C., 80° C., 81° C., 82° C., 83° C., 84° C., 85° C., 86° C., 87° C., 88° C., 89° C., 90° C., or any temperature within a range defined by and inclusive of any two of the foregoing temperatures. In one embodiment, the coated article or glove is dried in a hot air convection drier for about 30 minutes at about 90° C. All residual solvent and water is completely removed. During the drying process, remaining alcohol flashes off of the polymer coated surface and creates fine stomas where closed pores had existed before. This important process creates fine cavities and stoma structures to a depth of approximately 50 micron in the surface layer of the coating.

The process of this invention creates a single layer coating having a structure comprising two different zones: an inner and outer zone. The inner zone comprises microscopic walls, drapes and sheet-like structures that result from rapidly phase-separated polymer and which span the interstitial spaces of the constituent material of the article or glove. This inner zone thus occupies a volume inside the constituent material of the article or glove. For example, it would occupy both the interstitial space between the fibers that make up the yarn and also the spaces between the knit stitches of a knitted glove.

The inner zone has a thickness of approximately 600 micron, 650 micron, 700 micron, 750 micron, 800 micron, 850 micron, 900 micron, 950 micron, 1000 micron, 1050 micron, 1100 micron thick, or any thickness within a range defined by and inclusive of any two of the foregoing measurements. In one embodiment, this inner zone is approximately 900 micron thick. This inner zone may or may not have a uniform thickness throughout the instant invention. In some embodiments, the thickness of the inner zone may be about 600 micron or more at one or more locations and about 1100 micron or less in one or more other locations. In other embodiments, especially those involving omission of the first optional electrolyte treatment, the inner zone may occupy as much as about 1%, 2%, 3%, 4%, 5%, 6%, 7%, 8%, 9%, 10%, 20%, 30%, 40%, 50%, 60%, 70%, 80%, 90%, 100%, or any percentage within a range defined by and inclusive of any two of the foregoing percentages, of the total thickness of the article or glove being coated. The percentage of the total thickness of the coated article or glove occupied by the inner zone may be influenced by whether the polyurethane dispersion is allowed to fully penetrate the constituent material thereof.

The inner zone also comprises large voidage cavities having a maximum length of approximately 50 micron, 51 micron, 52 micron, 53 micron, 54 micron, 55 micron, 56 micron, 57 micron, 58 micron, 59 micron, 60 micron, 60 micron, 61 micron, 62 micron, 63 micron, 64 micron, 6 micron 5, 66 micron, 67 micron, 68 micron, 69 micron, 70 micron, 71 micron, 72 micron, 73 micron, 74 micron, 75 micron, 76 micron, 77 micron, 78 micron, 79 micron, 80 micron, 81 micron, 82 micron, 83 micron, 84 micron, 85 micron, 86 micron, 87 micron, 88 micron, 89 micron, 90 micron, 91 micron, 92 micron, 93 micron, 94 micron, 95 micron, 96 micron, 97 micron, 98 micron, 99 micron, 100 micron, 150 micron, 200 micron, 250 micron, 300 micron, 350 micron, 400 micron, 450 micron, 500 micron, 550 micron, 600 micron, 650 micron, 700 micron, 750 micron, 800 micron, 850 micron, 900 micron, or any length within a range defined by and inclusive of any two of the foregoing measurements. In some embodiments, these voids occupy about 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 100%, or any percentage within a range defined by and inclusive of any two of the foregoing percentages, of the volume of the inner zone. In other embodiments, these voids comprise about 50% to 80% of the volume of the inner zone.

The inner zone and its structure are vital contributors to the soft touch and preservation of the original flexibility and comfort of the constituent material of the article or glove, such as a fabric knit glove. The inner zone thus comprises a polymer impregnated fiber structure that is not stiff and provides the coated article or glove a soft flexible feel that is non-fatiguing to wear and is easily compressed. The polymer coated articles of this invention made by the process of this invention also comprise this zone structure.

The outer zone of the polymer coating comprises a thin contiguous polymer layer on top of the inner zone that has a thickness of about 40 micron, 41 micron, 42 micron, 43 micron, 44 micron, 45 micron, 46 micron, 47 micron, 48 micron, 49 micron, 50 micron, 51 micron, 52 micron, 53 micron, 54 micron, 55 micron, 56 micron, 57 micron, 58 micron, 59 micron, 60 micron, 60 micron, 61 micron, 62 micron, 63 micron, 64 micron, 6 micron 5, 66 micron, 67 micron, 68 micron, 69 micron, 70 micron, 71 micron, 72 micron, 73 micron, 74 micron, 75 micron, 76 micron, 77 micron, 78 micron, 79 micron, 80 micron, 81 micron, 82 micron, 83 micron, 84 micron, 85 micron, 86 micron, 87 micron, 88 micron, 89 micron, 90 micron, 91 micron, 92 micron, 93 micron, 94 micron, 95 micron, 96 micron, 97 micron, 98 micron, 99 micron, 100 micron, 101 micron, 102 micron, 103 micron, 104 micron, 105 micron, 106 micron, 107 micron, 108 micron, 109 micron, 110 micron, 111 micron, 112 micron, 113 micron, 114 micron, 115 micron, 116 micron, 117 micron, 118 micron, 119 micron, 120 micron, or any thickness within a range defined by and inclusive of any two of the foregoing measurements. This outer zone may or may not have a uniform thickness throughout the instant invention. In some embodiments, the thickness of the outer zone may be about 40 micron or more at one or more locations and about 120 micron or less at one or more locations.

This outer zone comprises several distinctive structures that significantly improve the desirable properties of the glove. Numerous microscopic bubbles form near and on the outer edge of the outer zone. These bubbles individually have a size of less than 50 micron. The bubbles form in such a way as to be stacked on top of one another. In some cases these bubbles burst into each other to form numerous microscopic stomas or capillaries that can traverse the full thickness of the outer zone. In some embodiments, these stomas can form vertical stacks that penetrate into the coating to a depth of about 50 micron, 51 micron, 52 micron, 53 micron, 54 micron, 55 micron, 56 micron, 57 micron, 58 micron, 59 micron, 60 micron, or any depth within a range defined by and inclusive of any two of the foregoing measurements. The outer zone also has a rough surface feature with numerous asperities randomly distributed over the full outer surface of the polymer coating. These surface asperities are less than 5 micron thick. The outer zone is also translucent, and can transmit any known wavelength of light through itself to an internal aspect of the coated article or glove. In some embodiments, the outer zone can transmit infra-red, ultra-violet, and visible light. In other embodiments, the outer zone can transmit light having wavelengths from about 10 nm to 1 mm. The outer zone is externally bounded by the environment and internally bounded by the inner zone.

This dual zone single layer structure creates a high moisture vapor transmission gradient from an aspect internal to the inner zone at a skin temperature to an aspect external to the outer zone at ambient temperature. In one embodiment, the skin temperature is higher than the ambient temperature. In another embodiment, the skin temperature is higher than about 32° C., and an ambient temperature is less than about 32° C. In yet another embodiment, the skin temperature is about 32° C., 33° C., 34° C., 35° C., 36° C., 37° C., 38° C., 39° C., or any temperature within a range defined by and inclusive of any two of the foregoing temperatures, and the ambient temperature is about 31° C., 30° C., 29° C., 28° C., 27° C., 26° C., 25° C., 24° C., 23° C., 22° C., 21° C., 20° C., 19° C., 18° C., 17° C., 16° C., 15° C., 14° C., 13° C., 12° C., 11° C., 10° C., 9° C., 8° C., 7° C., 6° C., 5° C., 4° C., 3° C., 2° C., 1° C., 0° C., or any temperature within a range defined by and inclusive of any two of the foregoing temperatures. It is widely accepted in the art that the primary mechanism for moisture vapor transmission in textiles is vapor diffusion through air. The diffusion coefficient of water vapor through air is 0.239 $cm^2$/sec and for a fabric such as cotton the coefficient approximates $10^7$ $cm^2$/sec. The moisture diffusion through the air portion of the inner zone of the instant invention approaches instantaneous, whereas moisture diffusion through a common fabric system or polymer coated fabric system is limited by the rate at which moisture can diffuse into and out of the fabric fibers and/or polymer structure. This slower moisture diffusion is a consequence of the lower moisture diffusivity of most common textiles and polymer materials. Consequently the inner zone of the instant invention, with its large air pockets, is perfectly suited for instantaneous moisture vapor transmission from the skin to the outer zone of the coating, and then to the atmosphere.

For example, any sweat given off is quickly vaporized into the large air filled cavities of the inner zone and the subsequent moisture vapor pressure gradient quickly transmits the water vapor to the microscopic capillaries or stomas of the outer zone and outer pore surfaces of the coating. There, the very large surface area of the outer zone stomas and pores provides accelerated heat transfer to the water or sweat causing it to quickly flash off as a vapor into the atmosphere. As the moisture flashes off it takes excess body heat with it and simultaneously cools the article user or glove wearer's hand(s).

The construction of the instant invention prevents sweat build up in a thin-wall polymer coated article or glove and provides a very comfortable dry feeling. A user of a thin-wall polymer coated glove of the instant invention may experience signs of the moisture vapor pressure gradient when removing the gloves from the user's hands. The higher moisture vapor pressure present in the inner zone structure's microclimate is released, which cools the air immediately adjacent to the hands and produces a cool, soothing sensation.

The dual zone structure described above also improves a user's ability to touch and feel through a thin-wall polymer coated article or glove of the instant invention because the bulk of the article or glove's constituent material is free of polymer content, is not stiff, and can be compressed with very little effort to provide a soft touch through which the hand can sense and discern features as small as about 0.25 mm. The dexterity of thin-wall polymer coated articles and gloves of the instant invention is likewise improved over other articles and gloves.

The thin-wall polymer coated articles and gloves of this invention do not contain any of the processing ingredients known to be associated with skin sensitization or cited in OSHA bulletin SHIB012808, such as latex proteins, sulfur, chlorides, zinc diethyldithiocarbamate, zinc dibutyldithiocarbamate, tetramethylthiuramdisulfide, dodecyl benzene sulfonate, ammonium hydroxide, and calcium carbonate. Additionally they do not contain any of the skin sensitizers commonly added to vinyl gloves, such as pthalates, stearates, and lead and cadmium stabilizers.

In one embodiment, the coating of this invention is colored with one or more pigments added during the dispersion step of manufacturing. In another embodiment, the coating of this invention is preserved by the addition of one or more antioxidants during the dispersion step of manufacturing.

In another embodiment, the thin-wall polymer coated articles and gloves of this invention are further improved by the addition of carbon black, which, when mixed with a small portion of activated carbon, will absorb and reduce odors caused by moisture and off-gases. In some embodiments, carbon black is used in an amount that is about 3.0%, 3.1%, 3.2%, 3.3%, 3.4%, 3.5%, 3.6%, 3.7%, 3.8%, 3.9%, 4.0%, 4.1%, 4.2%, 4.3%, 4.5%, 4.6%, 4.7%, 4.8%, 4.9%, 5.0%, or any percentage within a range defined by and inclusive of any two of the foregoing percentage, specifically including fractions thereof, by weight. Carbon black is particularly effective in sporting products that are frequently subjected to body oil and sweat degradation. Another means for de-odorizing a polymer coated article or glove of the instant invention is by addition of an amount molecular sieve to the dispersion, where the amount is about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, or any percentage by weight that is within a range defined by and inclusive of any two of the foregoing percentages, and specifically including fractions thereof. The addition of molecular sieve has the unexpected result of reducing the tensile load power of the polyurethane coating and making it feel softer and drier to the touch. In one embodiment, addition of about 10% by weight of molecular sieve to the polymer reduces the load curve of the polymer by about 15%. It is thought that the surface active structure of the molecular particles captures free ends of the polymer and prevents a higher degree of entanglement, thereby reducing tensile load.

The thin-wall polymer coated articles and gloves of this invention may also be improved by addition of photocatalytic nano-sized particles of titanium dioxide in the polyurethane dispersed phase. The addition of photocatalytic titanium dioxide produces a self-sterilizating and self-deodorizing effect. Photocatalytic titanium dioxide is preferably added to the polyurethane dispersed phase in a proportion of about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, or any percentage by weight of the prepolymer that is within a range defined by and inclusive of any two of the foregoing percentages, specifically including fractions thereof. It can be added simultaneously with pigment or, for maximum sterilization and deodorization effect, without pigment. It may also be added as a powder or suspension to articles or gloves of the instant invention during the manufacturing process while the coating is coagulating. The addition of small amounts of silver enhances the catalytic effect of the titanium dioxide. This effect only works with the photocatalytic form of titanium dioxide. In some embodiments, small amounts of silver are added to the disperse phase with photocalytic hydrophilic anatose titanium dioxide. When the titanium dioxide is irradiated with light, electrons jump into the conduction band and create free radicals in the form of anionic oxygen and hydroxl ions. These attack the respiratory functions in bacteria and degrade bacterial cell walls. Once the bacteria are dead the same radicals can degrade any toxic residue to carbon dioxide and water.

The unique properties of the hydrogen bonding of the polyurethane dispersion of the instant invention further allow the thin-wall polymer coated articles and gloves described herein to be repeatedly steam autoclaved at a temperature up to about 245° C. for more than 45 minutes without significant degradation of the polymer coated articles or gloves. Other latex or nitrile gloves cannot be sterilized in this way due to the occurrence of significant breakage of their cross links and subsequent polymer degradation.

The grip ability of the polyurethane coatings and thin-wall polyurethane coated articles and gloves described herein is higher than other polymers and comprises friction coefficients as high as about 0.6, 0.7, 0.8, 0.9, 1.0, 1.1, 1.2, 1.3, 1.4, 1.5, 1.6, 1.7, 1.8, and any value that is within a range defined by and inclusive of any two of the foregoing values, specifically including fractions thereof. The grip performance of the inventions described herein remains high even when the polyurethane coating is subjected to water, lubricants and/or oils. It is thought that the soft macromolecular structure of the polyurethane coating and the high density of hydrogen bonding increase both the real surface area of contact and the coefficient of friction component derived from intermolecular bonding at the asperities of the contact surfaces. This effect is greater than that demonstrated by other elastomers used to make coatings and gloves. Atomic force spectroscopy has confirmed that hydrogen bonding can significantly increase the coefficient of friction by intermolecular bonding.

EXAMPLES

The present invention is further described in the following Examples, which illustrate reductions to practice of the invention but do not completely define all of its possible variations.

Example 1

Manufacture and Analysis of a Flexible, Soft, Thin-Wall Polymer Coated Glove with Enhanced Dexterity and a Single Layer Coating Structure Comprising an Inner Zone and an Outer Zone A highly hydrogen bonded polyurethane prepolymer was formed by the reaction and subsequent dilution of a composition comprising 56% mole dimethlyldiphenyl diisocyanate, 31% mole polytetramethylene glycol, and 13% mole dimethylol propionic acid at 90° C. for 120 minutes. The reaction product of the composition was diluted with N-methylpyrrolidone until the concentration of N-methylpyrrolidone reached 10% by weight of the prepolymer.

A polyurethane dispersion was created by mixing the resulting polyurethane prepolymer into a bulk phase comprising an aqueous-protic solvent mixture containing 12% by weight ethanol in water. Other additives in the bulk phase included the amine chain extender ethylene diamine, 1.4% by weight of the non-ionic surfactant ehyoxylated nonyl phenol, and 3% by weight photocatalytic titanium dioxide (Degussa P-25). The dispersion was mixed for 3 hours with a simple electrically driven stirrer.

A nylon knit glove was applied to a hand-shaped former and directly dipped into the polyurethane dispersion until the palm and finger areas of the glove were covered. The glove was removed from the polyurethane dispersion and allowed to rest on the former until no drops of dispersion fell off the glove and the surface of the liquid polymer on the glove was smooth. The glove was then dipped for 1 minute into an electrolyte solution containing 12% by weight calcium nitrate in water at 30° C. The liquid polymer on the knitted glove surface coagulated to form a coating. The coated glove was then placed into a tank of 60° C. water for 30 minutes to leach out residual solvents. The coated and leached glove was then dried in a convection oven for 20 minutes at 90° C.

Figure 1A:
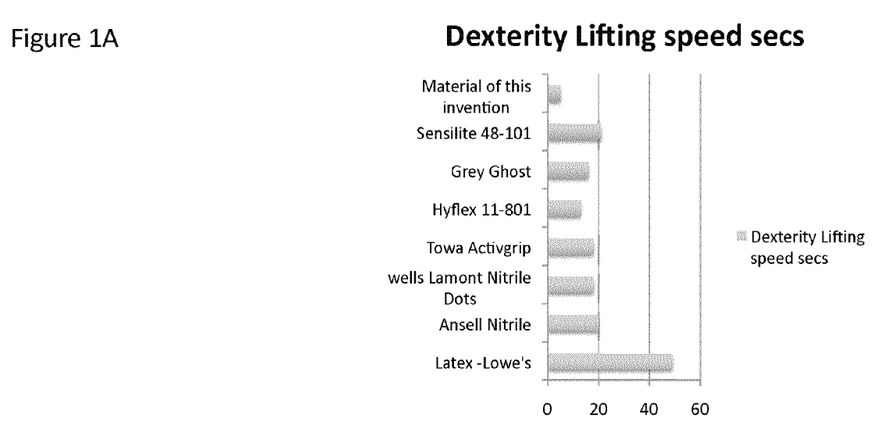
FIG. 1A illustrates the results of a dexterity lift speed test.
Figure 1B:
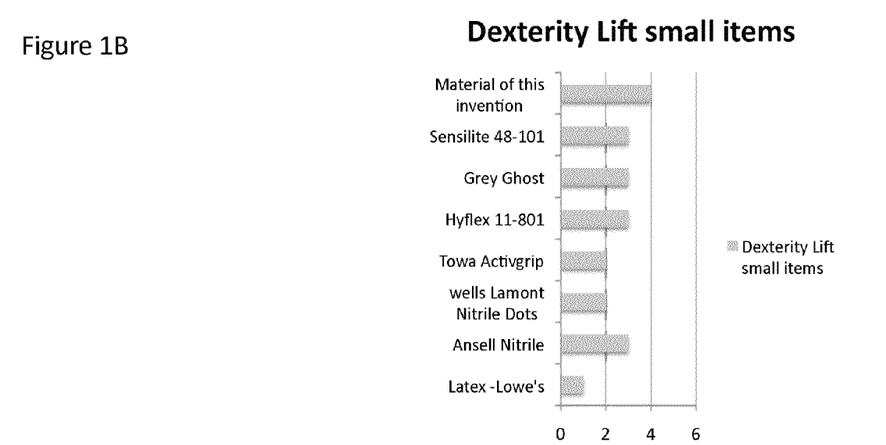
FIG. 1B illustrates the results of a dexterity lift capability test.
Figure 2:
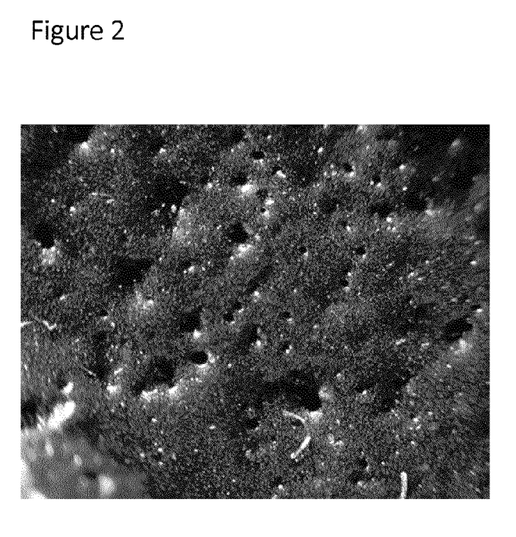
FIG. 2 provides a 40× magnified image of the surface of a commercially available nitrile glove made using a process to dissolve surface particulates.
Figure 3:
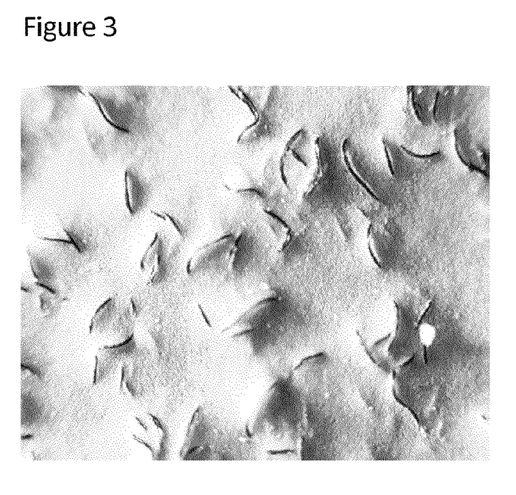
FIG. 3 provides a 40× magnified image of the surface of a commercially available nitrile glove made using a foam dispersion. Exposed nylon fibers are visible under the surface.
Figure 4:
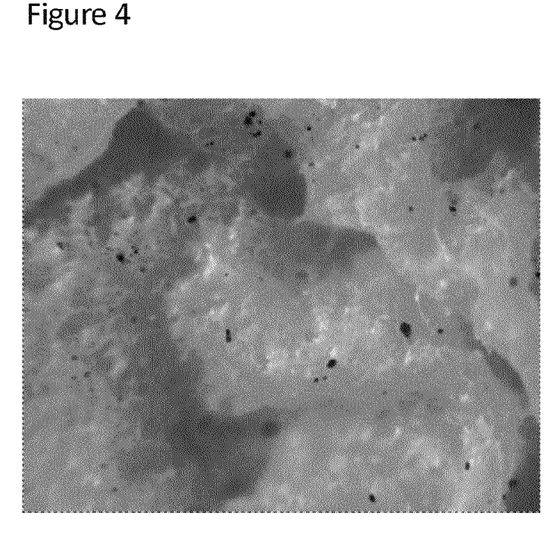
FIG. 4 provides a 40× magnified image the closed cell foamed surface of a commercially available latex glove.
Figure 5:
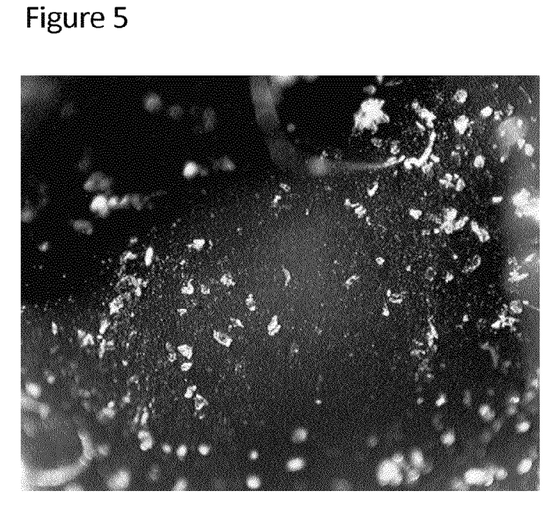
FIG. 5 provides a 40× magnified image of the surface of a commercially available nitrile glove manufactured with additional surface particulates.

The resulting thin-wall polymer coated glove was soft and flexible and provided very good dexterity, as indicated by both a dexterity lift speed test and a dexterity lift capability test. See FIGS. 1A and 1B. For the lift speed test, Applicant measured the time required to lift four objects and place them in a paper cup using a glove of the instant invention. A shorter time was interpreted as indicating better dexterity. The four objects included: i) a paper clip (52 mm long×1 mm thick), ii) a gasket (1 mm thick×18 mm diameter), iii) a washer (1 mm thick×10 mm diameter), and iv) a safety pin (27 mm long×6 mm wide×1 mm thick). Lift speed tests were repeated using various other commercially available gloves and materials. Results of dexterity lift speed tests are presented in FIG. 1A. For the lift capability test, Applicant evaluated whether or not a person could lift three small objects of different thicknesses using a glove of the instant invention. The baseline score for the test was set at 1. The baseline score was modified by +1 for each object a person wearing a glove of the instant invention could lift, and by +0 for each object that could not be lifted. A higher final score was interpreted as indicating better dexterity. The three objects included: i) a common American five cent coin (1.77 mm thick), ii) a flat washer (0.98 mm thick), and iii) a wafer (0.35 mm thick). Dexterity lift capability tests were repeated using various other commercially available gloves and materials. Results of dexterity lift capability tests are presented in FIG. 1B.

Figure 6:
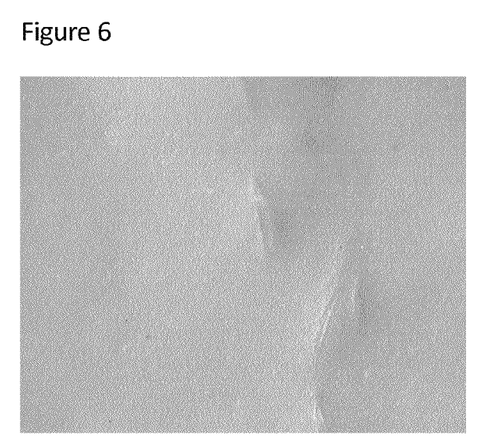
FIG. 6 provides a 40× magnified image of the smooth surface of a glove of the instant invention.
Figure 7:
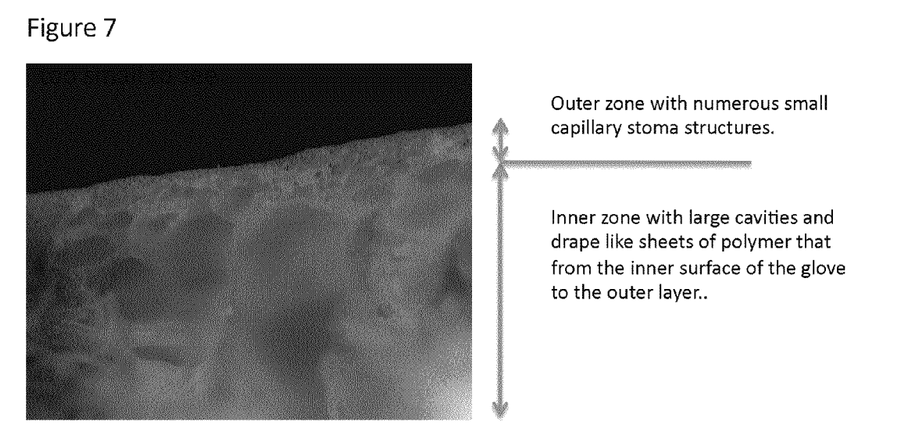
FIG. 7 provides a 100× magnified image of a cross section of the polymer coating of the instant invention and demonstrates two distinct zones: an outer zone having numerous small capillary and/or stoma-like structures, and an inner, zone having large cavities and drape or sheet-like polymer structures.
Figure 8:
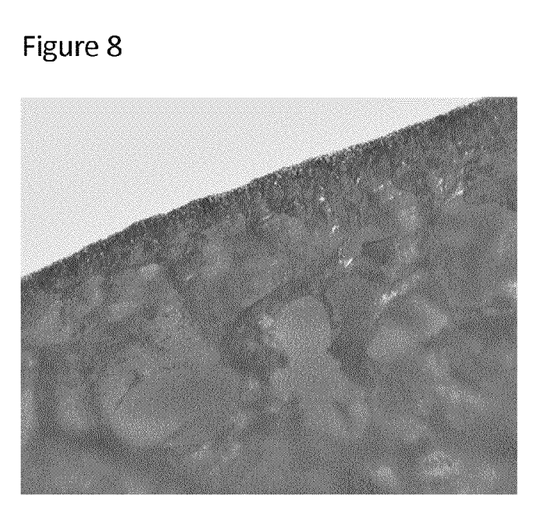
FIG. 8 provides a 100× magnified image of a cross section of the polymer coating of the instant invention and further demonstrates the division of different sized polymer cavities between the two zones of the coating. The smaller vesicle forming capillary and/or stoma-like structures characteristic of the outer zone are shown in dark blue.
Figure 9:
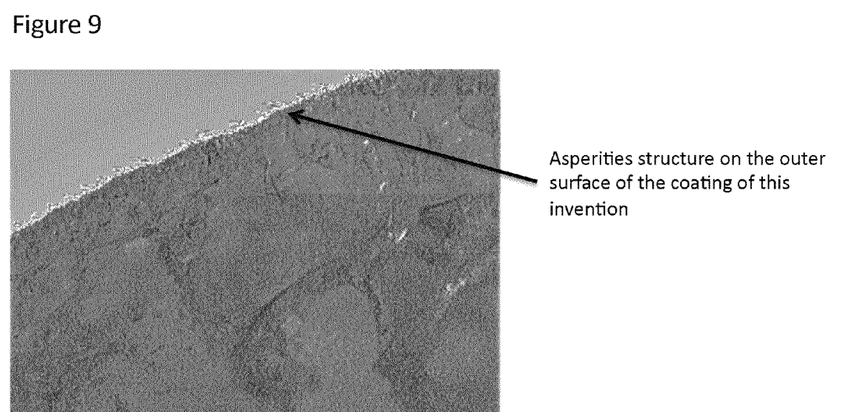
FIG. 9 provides a 200× magnified image of a cross section of the polymer coating of the instant invention. Numerous asperities are visible on the external surface of the outer zone.
Figure 10:
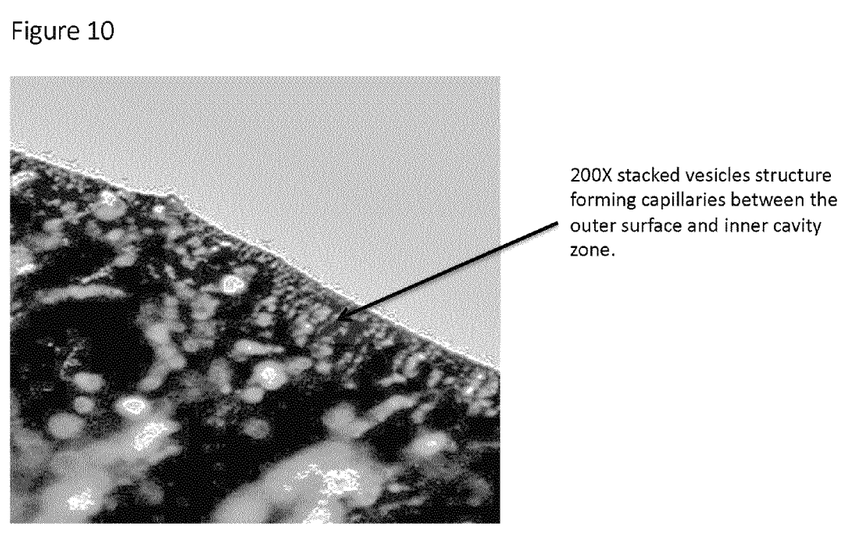
FIG. 10 provides a 200× magnified image of a cross section of the polymer coating of the instant invention. Stacked vesicle and/or stoma-like structures forming capillaries are visible between the surface of the outer zone and the large cavities of the inner zone.

The surface of the resulting glove appeared smooth when viewed at 40× magnification, unlike the surface of some other gloves. See FIG. 6 as compared with FIGS. 2-5. The glove also possessed a single layer coating structure comprising an inner zone with large cavities and an outer zone, which had numerous capillary-like stomas that traversed the outer surface of the coating to the inner zone where the large cavities and knitted fibers were located. See FIGS. 6, 7, 8, and 10. An outer zone with a high density of stomas and walled pores that provide a large surface area for vapor evaporation were visible under magnification. See FIGS. 7, 8, and 10. The coated glove also exhibited a plurality of asperity structures on the outer surface of the polymer coating. See FIG. 9.

Example 2

Analysis of Factors Affecting the Grip of Thin-Walled Polymer Coated Gloves

Using the process set forth in Example 1 and terminating at the coagulation step, numerous thin-wall polymer coated gloves were prepared and separated into two groups. Gloves in Group 1 were then soaked in water at 25° C. for a period extending from 1 minute to over 20 minutes, while gloves in Group 2 were soaked in water at 60° C. for the same period. The coefficient of friction for each group of gloves was determined at different time intervals.

Figure 11:
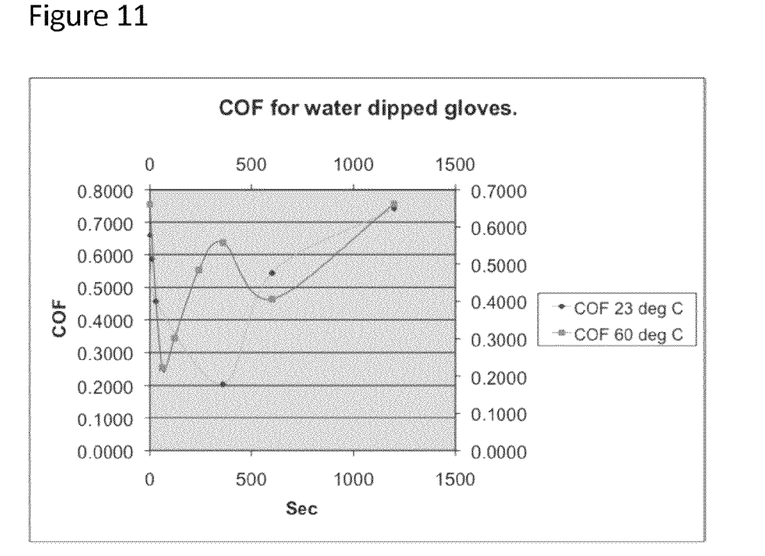
FIG. 11 provides a chart illustrating the effect of soak time and temperature during manufacturing on the coefficient of friction of gloves of the instant invention.
Figure 12:
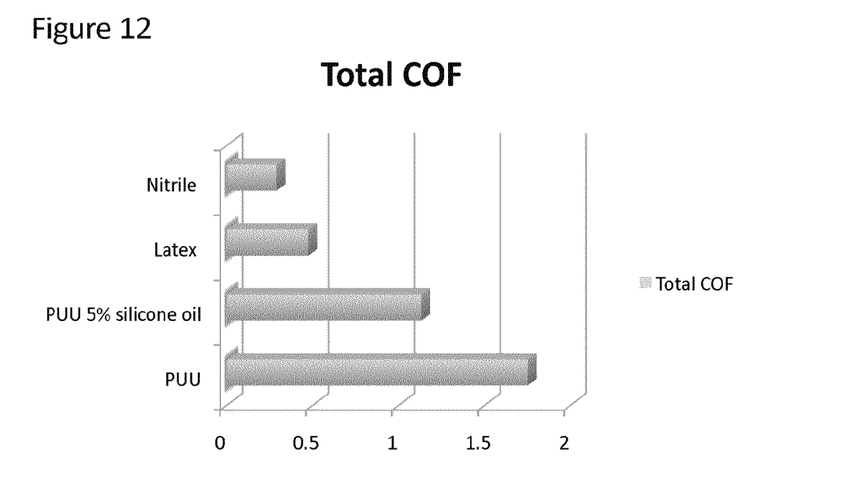
FIG. 12 provides a chart comparing the coefficients of friction of four different polymer coatings. "PUU" means polyurethane-urea. "PUU 5% silicone oil" means a polyurethane-urea with a 5% silicone oil added to demonstrate the impact of the oil on the coefficient of friction of a PUU coating.

The different soaking treatments demonstrated that soaking periods less than about 6 minutes cause the coefficient of friction to decrease, while soaking periods longer than 6 minutes cause the coefficient of friction to increase. See FIG. 11. This data indicates that the soaking process is the key to controlling the friction coefficient of the final polyurethane coating of the instant invention. The data also demonstrated that while soaking at a higher temperature speeds up the rate at which the coefficient of friction increases, soaking at lower temperature provides a higher final coefficient of friction. A comparison of coefficients of friction for various polymer coatings is presented in FIG. 12.

Example 3

Figure 13:
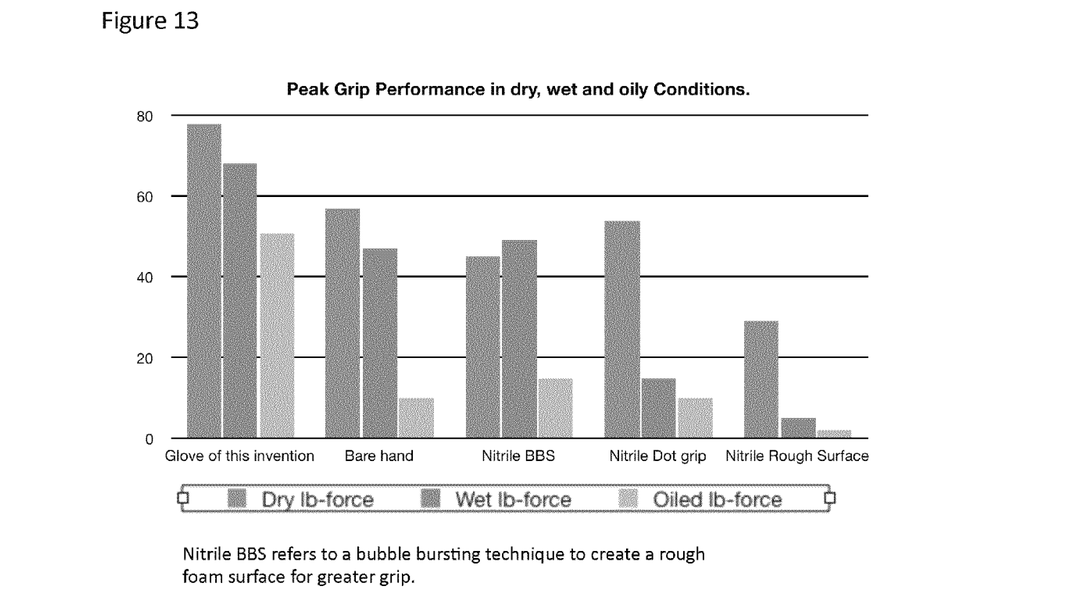
FIG. 13 provides a chart comparing the grip ability of gloves of the instant invention with that of the bare hand and other commercially available gloves under dry, wet, and silicone lubricated conditions. "Nitrile BBS" means nitrile gloves made with a bubble bursting technique to create a rough foam surface.

Analysis of the Grip of Thin-Wall Polymer Coated Gloves as Compared with the Grip of Commercially Available Gloves Thin-wall polymer coated gloves were made using the full manufacturing process set forth in Example 1. A torque meter was used to measure the peak torque achieved by a glove of the instant invention before slippage occurred between the surface of the polymer coated glove and a length of two-inch diameter tubular PVC pipe. Peak torque was measured between the glove and PVC pipe using three PVC pipe surface conditions: 1) dry, 2) saturated with water, and 3) saturated with an emulsified siloxane lubricant. Grip ability tests were repeated using a bare human hand and various other commercially available gloves. Results of grip ability tests are presented in FIG. 13.

Comparison of the grip ability test data for Applicant's thin-wall polymer coated gloves with that of other commercially available gloves demonstrated the superiority of Applicant's gloves under the conditions tested. Most significantly, Applicant's gloves maintained their grip markedly better against wet and silicone lubricated surfaces than did the other gloves.

Example 4

Figure 14:
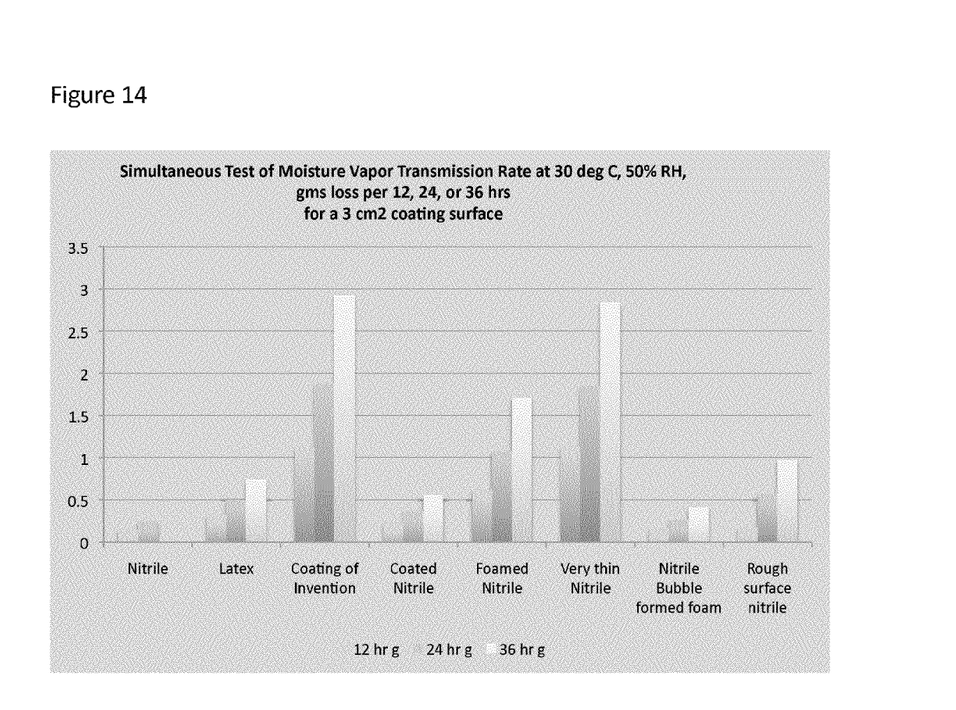
FIG. 14 provides a chart comparing the moisture vapor transmission rates of gloves of the instant invention with that of various commercially available gloves while held in a stable, temperature controlled humid environment.

Analysis and Comparison of the Breathability of Thin-Walled Polymer Coated Gloves with the Breathability of Commercially Available Gloves Thin-wall polymer coated gloves were made using the full manufacturing process set forth in Example 1. Applicant's gloves and various embodiments of other commercially available gloves were simultaneously tested to determine their moisture vapor transmission rate ("MVTR") at three different time points while held in a controlled environment at 30° C. and 50% ambient humidity. Comparison of the resulting MVTR data indicated that Applicant's gloves consistently provide higher moisture vapor transmission rates than the other gloves tested. See FIG. 14.

What is claimed is:

1. An article comprising a polymer coating on at least a portion of said article's surface, wherein said polymer coating comprises a polyurethane dispersion comprising the reaction product of:
   (1) an isocyanate functional prepolymer comprising the reaction product of:
      (i) a polyol;
      (ii) an isocyanate; and,
      (iii) a stabilizing ingredient;
   (2) a chain extender; and,
   (3) a chain terminator, and
wherein said polymer coating further comprises a two-zone structure comprising:
   (1) an inner zone, comprising:
      (i) a volume within the interstitial spaces of the constituent material of said article that is approximately 600 micron to 1100 micron thick; and,
      (ii) a plurality of large polymer cavities, said polymer cavities ranging in size from 50 micron to 900 micron and comprising approximately 20% to 80% of said volume of said inner zone;
   (2) a porous and translucent outer zone capable of transmitting light, said outer zone comprising:
      (i) a contiguous polymer layer approximately 40 micron to 120 micron thick, said contiguous polymer layer being bounded on an internal aspect by said inner zone and bounded on an external aspect by an external surface;
      (ii) a plurality of fine polymer cavities, said polymer cavities being smaller than 50 micron in size and being vertically oriented in relation to one another such that said fine polymer cavities form stomas and/or capillaries throughout the full thickness of said outer zone; and,
      (iii) an external surface comprising a plurality of up to 5 micron thick asperities positioned randomly thereon.

2. The article of claim 1, wherein:
   (1) said polyol is selected from the group consisting of: polyether glycols, polyester glycols, hydrogenated polybutadiene polyols, fluorinated polyethers and polysiloxane polyols;
   (2) said isocyanate is selected from the group consisting of: 1,3 bis(1-isocynato-1-methyl)cyclohexane, diphenylmethane 4,4-diisocynate, diphenylmethane 2,4-diisocynate, 1-isocyanato-4-[(4-isocyanatophenyl)methyl]benzene, isophorone diisocyanate, 1,1'-methylenebis(4-isocyanatocyclohexane), toluene diisocyanate, hexamethyl diisocyanate, and dodecamethylene diisocyanate; and,
   (3) said stabilizing ingredient is selected from the group consisting of: i) an ionic compound having at least one active hydrogen and that is soluble in the bulk phase of the dispersion and which contains an ionic group or group containing a moiety capable of forming an ionic group, ii) a non-ionic compound containing polyester, polyether or polycarbonate groups with a ratio of 4 or less carbon atoms per oxygen atom, and iii) mixtures thereof;
   (4) said chain extender is selected from the group consisting of: ethylene diamine, 1,3-diaminocyclohexane, 1,2-diaminopropane, 1,3-diaminopropane, metaxylylene diamine, ethylene glycol, 1,3-trimethylene glycol, 1,4-butanediol, 2,2-dimethyl-1,3-propylene diol, and mixtures thereof; and,
   (5) said chain terminator is selected from the group consisting of: diethylamine, mono-alcohols, and compounds having single reactive end groups that can bond with an isocyanate group and thereby terminate polymerization.

3. The article of claim 2, wherein said polyether glycol is selected from the group consisting of: polyethylene glycols, polypropylene glycols, and poly tetramethylene glycols.

4. The article of claim 3, wherein said poly tetramethylene glycol is selected from the group consisting of: poly(tetramethylene ether)glycol, poly(tetramethylene-co-2-methyl-tetramethyleneether)glycol, and poly(ethylene-co-tetramethylene adipate)glycol.

5. The article of claim 1, wherein said polyurethane dispersion further comprises a macromolecular structure formed by polymer chain alignment and wherein said macromolecular structure is substantially comprised of hard segment hydrogen bonding.

6. The article of claim 1, wherein:
   1) said isocyanate functional prepolymer further comprises a polar aprotic solvent selected from the group consisting of: dimethylsulfoxide, liquid amides, tetrahydrofuran, methyl ethyl ketone, toluene, cyclohexane, and methylene chloride; and,
   2) the concentration of said polar aprotic solvent in the prepolymer is from about 1% to about 10%.

7. The article of claim 6, wherein said liquid amide is selected from the group consisting of: dimethylacetamide (DMAc), dimethylformamide (DMF), and N-methylpyrrolidone (NMP).

8. The article of claim 1, wherein:
1) said polyurethane dispersion further comprises a bulk phase comprising water and a polar protic solvent; and,
2) the concentration of said polar protic solvent comprises 2% to 80% by weight of said bulk phase.

9. The article of claim 2, wherein:
1) said ionic compound is selected from the group consisting of: N-alkyl dialkanolamines, sulfonates, phosphates, phosphonates and carboxylates; and,
2) the concentration of said ionic compound comprises from 3% to 25% mole of said isocyanate functional prepolymer.

10. The article of claim 2, wherein:
1) said non-ionic compound is a polyoxylated glycol containing at least one polyethylene oxide group; and,
2) the concentration of ethylene oxide moiety comprises from 10% to 50% mole of said isocyanate functional prepolymer.

11. The article of claim 1, wherein:
1) the polyurethane dispersion further comprises a solid additive selected from the group consisting of: molecular sieve, carbon black, photocatalytic titanium dioxide, and mixtures thereof; and,
2) the concentration of said solid additive comprises from 0.1% to 10% by weight of said isocyanate functional prepolymer.

12. The article of claim 11, wherein said photocatalytic titanium dioxide has an average particle size of 2 nm to 70 nm and produces reactive oxygen species when irradiated by ultra-violet light.

13. The article of claim 1, wherein said article comprises thin-walled articles, gloves, broom handles, mop handles, hand tools, hammers, screw drivers, levers, pry bars, automobile steering wheels, knife handles, and cookware handles, apparel, sporting equipment, films, and medical coverings.

14. The article of claim 13, wherein said article is a glove made of a material selected from the group consisting of: textiles, knitted fibers, non-woven fibers, soft fibers, hollow fibers, and mixtures thereof.

15. The article of claim 14, wherein said glove is made of the hollow-core polyester fiber fabric.

16. The article of claim 14, wherein said article provides:
(1) at least a 40% better grip than the human hand when gripping a dry object;
(2) at least a 55% better grip than the human hand when gripping a wet object; and,
(3) at least an 80% better grip than the human hand when gripping an object lubricated with an oil-based lubricant;
wherein said object is a length of 2 inch diameter PVC tube.

17. The article of claim 14, wherein said article has a moisture vapor transmission rate greater than 3500 g/24 hrs/m$^2$.

18. The article of claim 1, wherein said article can endure more than 22 sterilization cycles in a steam autoclave at 245° C. for at least about 45 minutes without significant degradation of the polymer coating.

19. The article of claim 1, wherein said article further comprises a self-deodorizing capability, a self-sanitizing capability, or both.

* * * * *